United States Patent
Schulte et al.

(10) Patent No.: US 7,184,881 B2
(45) Date of Patent: Feb. 27, 2007

(54) METHOD FOR DIAGNOSING ERRORS IN AN INTAKE SYSTEM OF AN INTERNAL COMBUSTION ENGINE HAVING A VARIABLE INTAKE MANIFOLD GEOMETRY

(75) Inventors: Wolfgang Schulte, Munich (DE); Gerd Kraemer, Baierbrunn (DE); Heiko Konrad, Baierbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/397,720

(22) Filed: Apr. 5, 2006

(65) Prior Publication Data

US 2006/0184311 A1   Aug. 17, 2006

Related U.S. Application Data

(63) Continuation of application No. PCT/EP2004/011169, filed on Oct. 6, 2004.

(30) Foreign Application Priority Data

Oct. 8, 2003   (DE) ................. 103 46 734

(51) Int. Cl.
  *G01M 15/05*   (2006.01)
(52) U.S. Cl. .................................. 701/114
(58) Field of Classification Search ......... 701/114, 701/110, 102; 123/350, 352, 399
  See application file for complete search history.

(56) References Cited

U.S. PATENT DOCUMENTS

| | | | |
|---|---|---|---|
| 5,080,051 A * | 1/1992 | Hitomi et al. | 123/184.31 |
| 5,133,308 A * | 7/1992 | Hitomi et al. | 123/184.31 |
| 6,932,055 B2 * | 8/2005 | Rado | 123/352 |

FOREIGN PATENT DOCUMENTS

| | | |
|---|---|---|
| DE | 40 05 973 A1 | 9/1991 |
| DE | 197 27 669 A1 | 1/1999 |
| DE | 197 28 600 A1 | 1/1999 |
| DE | 198 03 804 A1 | 8/1999 |
| DE | 101 44 674 A1 | 4/2003 |
| DE | 102 34 492 A1 | 2/2004 |
| EP | 0 521 545 A2 | 1/1993 |
| EP | 0 848 145 A2 | 6/1998 |
| JP | 5321674 | 7/1993 |
| WO | WO 00/11332 | 3/2000 |

OTHER PUBLICATIONS

International Search Report for PCT/EP2004/011169 dated Jan. 19, 2005.
Written Opinion for PCT/EP2004/011169.
Examination Report for 103 46 734.3-26 dated Jul. 23, 2004.

* cited by examiner

*Primary Examiner*—Hieu T. Vo
(74) *Attorney, Agent, or Firm*—Crowell & Moring LLP

(57) ABSTRACT

A method for diagnosing errors in an intake system of an internal combustion engine having a variable intake manifold geometry is provided. According to the method, an air mass flow oscillation in the intake manifold is detected at an engine rotational speed that is present, the detected air mass flow oscillation is subjected to signal analysis to determine a characteristic actual oscillation variable which is compared to a setpoint oscillation variable associated with the engine rotational speed that is present.

20 Claims, 3 Drawing Sheets

METHOD FOR DIAGNOSING ERRORS IN AN INTAKE SYSTEM OF AN INTERNAL COMBUSTION ENGINE HAVING A VARIABLE INTAKE MANIFOLD GEOMETRY

CROSS-REFERENCE TO RELATED APPLICATIONS

This application is a continuation application of International Patent Application No. PCT/EP2004/011169, filed on Oct. 6, 2004, and claims priority under 35 U.S.C. § 119 to German Patent Application No. 103 46 734.3 filed Oct. 8, 2003. The entire disclosure of the aforementioned documents is herein expressly incorporated by reference.

BACKGROUND AND SUMMARY OF THE INVENTION

The present invention relates to a method for diagnosing errors in an intake system of an internal combustion engine having a variable intake manifold geometry. Compared to rigid intake systems, whose geometric configuration of intake manifold lengths, pipe diameters, or container capacities represents a compromise with respect to the location and magnitude of the maximum torque or power, the full-load characteristics may be optimized by expanding the variability. Intake systems having a variable geometry, referred to below as variable intake systems, are used to optimize the torque curve in uncharged spark-ignition engines.

The aim of variable intake systems is to achieve high engine torque values over the largest possible rotational speed range. The principle of variable intake systems is based, among other factors, on the fact that sympathetic oscillations, for example, are generated in the air mass that is drawn into the intake manifold. For an appropriate energizing frequency and phase position of the oscillation, a significant charging effect is produced at the intake valves (caused by increased air feed) which results in increased torque of the internal combustion engine.

The degree of such resonance charging depends on the energizing frequency, which is produced by the charge exchange of the cylinders and is proportional to the rotational speed, and the geometry of the intake system (for example, the length of the intake manifold or the volume of the intake system in which the air oscillation develops). The energizing frequency is specified by the timing-displaced superimposition of the intake energization, common in multicylinder engines, and the engine rotational speed.

In intake manifold systems having a variable-length intake manifold, for example, resonance charging develops at low engine rotational speeds only when the length of the intake manifold is relatively large. With increasing rotational speed, the intake manifold length necessary for resonance charging decreases. It is thus possible to optimize a fixed intake manifold length only at exactly one nominal rotational speed point. As the result of adjusting the intake manifold lengths for variable intake systems, resonance charging of the air drawn in develops at multiple rotational speeds, thereby significantly improving the overall torque curve of the engine.

In principle, a distinction may be made between two designs of common, modified geometries. Both methods share the common aim of making optimal use of the natural frequency of the oscillatory gas flow in the container and piping system of the intake system in order to increase the torque.

In the one design, the effective length of the individual cylinder ram tubes, and thus the natural frequency thereof, is varied with the objective of synchronizing the propagation time of the pressure waves reflecting at the open tube end with the energizing intake wave, based on the valve control times. The propagation time over the length of the intake manifold may be optimized by matching to the effective opening times of the valves, which change with the engine rotational speed (see FIG. 1). Exemplary embodiments are described in DE 197 28 600 C2 as a simple switching version, or in EP 0 848 145 B1 as an infinitely adjustable version. The adjustment of the length of the intake manifold is a common method for highly-energizing frequencies, i.e., primarily for optimizing the maximum power.

In the other design, as a result of varying the container volume (effective diameters or lengths; see FIG. 2) the natural frequency of the overall system is matched so that the energizing gas dynamics produce only oscillation resonance, preferably at low energizing frequencies (low rotational speeds, small number of cylinders, or slight interaction among the intake cylinders). The characteristic oscillation may also extend over the opened throttle valve (full load) via the hose, air filter, and intake snorkel. Several exemplary embodiments of a four-cylinder engine having one change-over valve and an eight-cylinder engine having three change-over valves are described in DE 198 03 804 A1. This so-called container resonance matching is usually combined with low-frequency energizing, and therefore aims to eliminate torque in the lower- and mid-range of the rotational speed.

In actual practice, both working mechanisms overlap one another, and may be combined to achieve a targeted effect, as described in EP 1 105 631 B1, for example. Multiple configurations of the individual working mechanisms are also possible.

The proper functioning of variable intake manifold geometries is typically monitored in the rotational speed range having maximum effect—i.e., preferably at high load or at full load—by comparing the achieved cylinder charging with known values stored in the control device. Alternatively, targeted control for intentional mismatching to the intake manifold is performed in the rotational speed and load range having a clear effect, followed by a comparison of the differential values of control without mismatching and control with mismatching. The characterizing feature of both methods is the direct, or also indirect, evaluation (lambda displacement, for example) of the achieved result, i.e., the average cylinder fillings. On the one hand, the disadvantage lies in the fact that the reliable diagnostic operation resulting from the greatly varying operating and environmental conditions must remain limited to a narrowly defined operating range of the engine. On the other hand, interference factors have undesired consequences on the driving characteristics or the driving performance (online monitoring).

Simpler diagnostic methods are currently suited only for a very rough prediction as to whether or not an error is present. For electrically actuated regulating systems, these are generally only examined for drive-side sources of error in the actuating drive. For example, a check is made as to the presence of a short circuit or an output stage diagnosis of the output stages that actuate the regulating system.

A diagnostic method for checking actuators for controlling internal combustion engines is described in a general manner in DE 40 05 973 A1. In this diagnostic method, actuating signals are detected by the actuators when the actuators are modified, and depending on these actuating signals, operating data for the internal combustion engine, which in turn are directly based on the actuation by the actuator, are stored as actual values in the diagnostic unit and are compared to stored setpoint values.

Furthermore, from DE 197 27 669 A1 a method is known for monitoring the function of an intake manifold valve for change-over of the intake manifold in an internal combustion engine. By use of this method, the intake manifold pressure is computed for at least two different intake manifold valve positions, while at the same time the intake manifold pressure is measured by a pressure-measuring device. For error evaluation, the differences in the computed and measured intake manifold pressures at the various intake manifold valve positions are generated and evaluated.

The present invention provides an additional diagnostic possibility which is an improvement and which is implemented using the simplest possible means.

The present invention is based on the finding that the variabilities of the intake manifold geometry are based essentially on the matching of oscillations. Thus, in contrast to a result-based evaluation, it is proposed to perform the function monitoring based on the gas dynamics-related oscillatory characteristics of frequency, phase position, and amplitude. To this end, a significant signal having sufficient dynamic resolution is evaluated by use of a suitable analytical method. Suitable as measurement signals are characterizing physical variables such as air mass flow rate, volumetric air flow rate—which are proportional to the gas flow—or also intake manifold pressure. The measurement site should advantageously be positioned at the location of, or in the vicinity of, the dynamic effect.

According to the present invention, the air mass flow oscillation present in the intake manifold or in the intake system is detected in an engine rotational speed range that is present and is subjected to signal analysis. At least one characteristic oscillation variable, such as frequency and/or amplitude and/or phase displacement, in addition to the engine rotational speed that is present or the instantaneous active engine rotational speed range, are detected and stored. The air mass flow oscillation may be determined by an absolute or differential pressure sensor situated in the collector for the intake system. Alternatively or additionally, for detection of the air mass flow oscillation, an air mass flow sensor may be situated at the entrance to the collector for the intake system.

References to engine rotational speed below may also include the case of individual, specialized engine rotational speed ranges.

The characteristic oscillation variable is subsequently compared to the setpoint oscillation variable that is associated with the active engine rotational speed that is present. The setpoint oscillation variable may either be specified by variables present from the beginning (computed once or determined by testing) for multiple associated engine rotational speeds, or may be constantly recalculated for instantaneous operating states by use of an available computing model. For the case that the detected air mass flow oscillation in one or more characteristic variables deviates from a reference variable, which is predetermined or simulated by a model, by more than a specified quantity, a control unit may generate an error report. Thus, based on the method according to the invention a diagnostic possibility is provided which by use of simple means detects very different types of errors that occur in an intake system. In addition to electrical errors in regulating units in the intake system, mechanical errors in the system such as jamming of a regulating unit, faulty closing of intake manifold ducts, or sluggishness of the actuators, for example, may be diagnosed. Additional components are also not necessary for implementing the invention. Instead, sensors that are already present, such as highly dynamic air mass and/or pressure sensors for load detection, may be used for detecting the air mass flow oscillation, and the data therefrom evaluated by the method according to the invention. For this purpose, the detected air mass flow oscillation undergoes signal analysis. Errors occurring in the regulating unit for the intake manifold geometry of the intake system are detected by comparing the signals in the error case (erroneous signals detected) with signals in the error-free case (reference or setpoint variables).

In exemplary embodiments of the present invention, resonance oscillations of the air mass drawn into the intake manifold or the intake system are measured and evaluated. Error recognition may be performed by, for example, signal analysis of the oscillation amplitudes and/or the oscillation frequency and/or the phase position of the observed signal.

Since the effect of a faulty regulating unit is seen only in the operating points of the internal combustion engine in which a charging effect normally occurs, i.e., in the operating points in which a resonance oscillation is present in the intake manifold, only in these cases can a target-oriented diagnosis be carried out in a meaningful way. For this reason, the diagnosis may be advantageously freely switched only in a range defined via the engine rotational speed and/or the engine load.

On the one hand, the diagnosis may be performed during normal operation of the internal combustion engine (online monitoring), whereby signals which appear, depending on the operating state, are evaluated. To increase the precision of the diagnosis, the actuators for regulating the intake system geometry (length of the intake manifold, for example) may also be actuated in a targeted manner for test purposes. For a test actuation, it is important that the interventions in the normal operation of the internal combustion engine based thereon remain at a tolerable level for the user.

Alternatively or additionally, the diagnosis may also be initiated in a targeted manner in a service operation by use of a test device. It is advantageous for the operating points in which a faulty regulating device can be detected most reliably to be traversable in an accurate and reproducible manner. Furthermore, in such a service operation the regulating device may be actuated freely and without regard to drivability errors (an unintended jerking, for example, could thus be produced in driving mode) by use of test signals in such a way that accurate localization of error is reliably ensured.

Other objects, advantages and novel features of the present invention will become apparent from the following detailed description of the invention when considered in conjunction with the accompanying drawings.

BRIEF DESCRIPTION OF THE DRAWING FIGURES

The present invention is explained in greater detail below, with reference to two exemplary embodiments. The figures show the following:

DETAILED DESCRIPTION OF THE DRAWINGS

Figure 3:
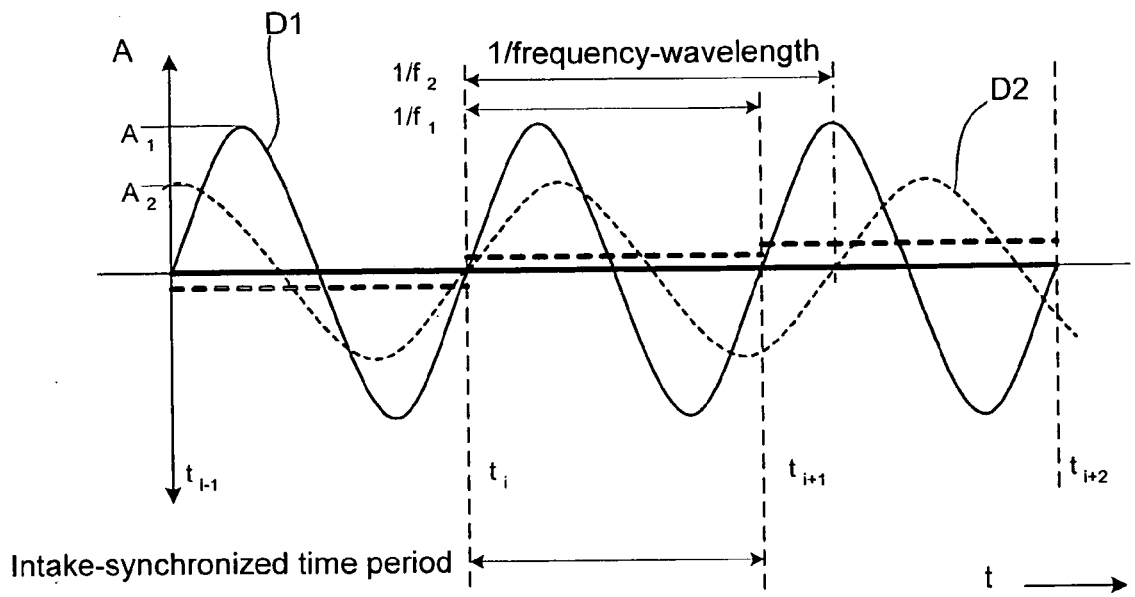
FIG. 3 illustrates a pressure curve within an intake system in the non-error and error cases, for a variable intake system having a continuously variable intake manifold length.

FIG. 3 schematically illustrates oscillation signals of pressure curves for air mass flow oscillation, located in an intake manifold, for a variable intake system having a variable intake manifold length. The curve of the oscillation signals is very idealized. The actual curve occasionally deviates considerably from the illustrated curves. The characteristics such as wavelength, frequency, and amplitude, however, are also reflected in all actual curves. The oscillation curve D1 represents the progression of an error-free variable intake system having variable intake manifold lengths. The optimum oscillation curve is set only when an intake manifold length is optimally set for the corresponding operating conditions. In a deviation from the optimum intake manifold length, the amplitude drops (A1=>A2) and the frequency (f1=>f2) and phase position change. For a non-optimum intake manifold length, an oscillation curve D2 is set which has a modified frequency, amplitude, and phase position (shown in dashed lines). A comparison of the average amplitude values with the measured signals over one or more intake-synchronized time period segments Ti shows that in the case of resonance energization the average amplitude value remains constant at zero for an optimum intake manifold length (also independently of the phase position or the measurement location). In a deviation from the optimum intake manifold length—i.e., in the error case for which the intake manifold change-over has not occurred or is faulty—the magnitude of the average value changes from time period to time period. Such an error may be precisely detected by use of a logic unit by comparison of setpoint and actual values. Alternatively or additionally, the amplitude, frequency, and/or phase position may also be monitored as such for error recognition instead of monitoring the average amplitude.

Figure 1:
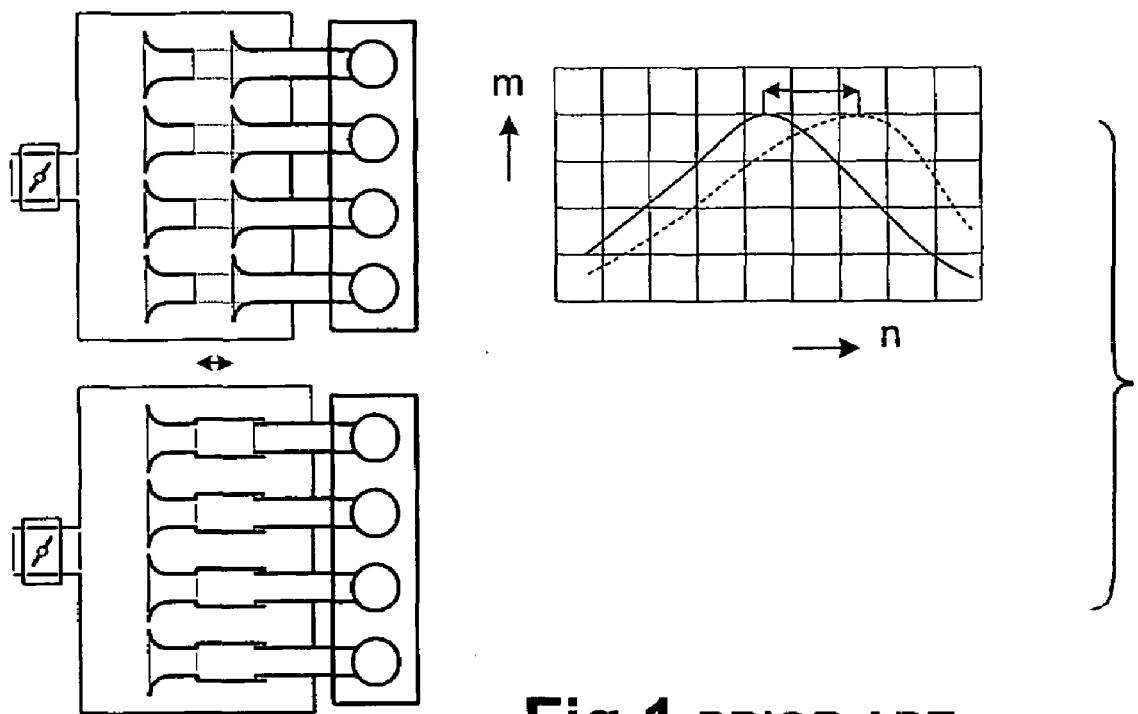
FIG. 1 illustrates the effect of varying the effective length of individual cylinder ram tubes with respect to engine rotational speed in an intake system.
Figure 2:
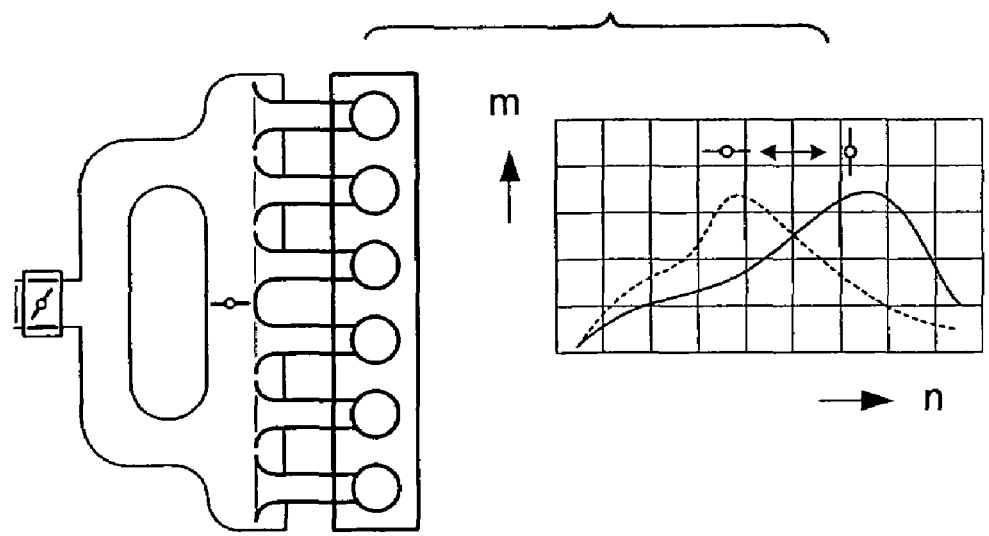
FIG. 2 illustrates the effect of varying the container volume with respect to engine rotational speed in an intake system.
Figure 4:
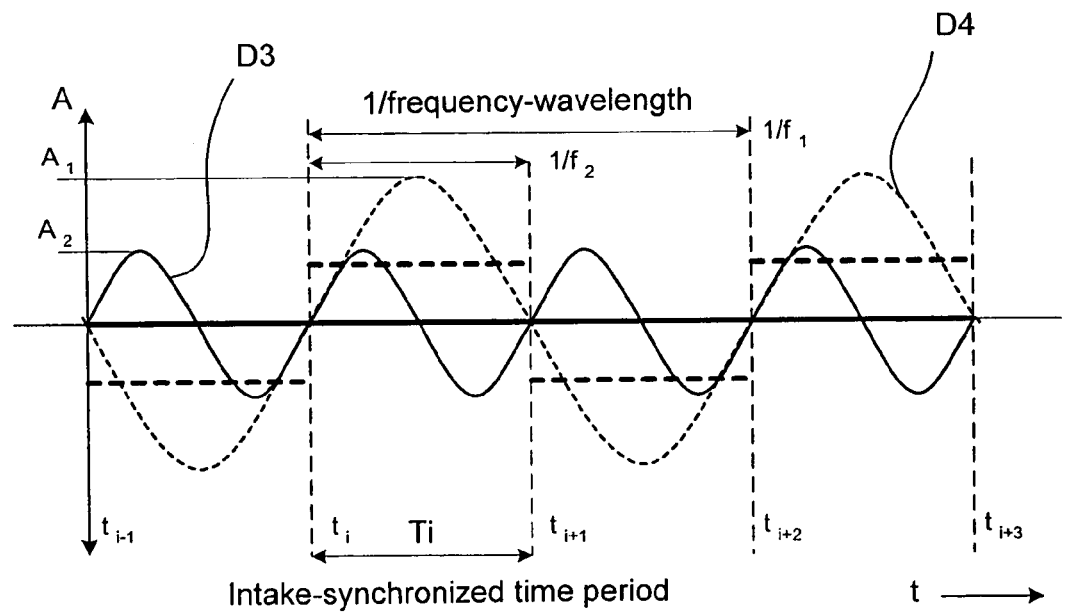
FIG. 4 illustrates a pressure curve within an intake system in two different operating states, for a variable intake system having a discretely modifiable geometry.

FIG. 4 shows the oscillation signals of measured pressure curves in a variable intake system having a modifiable intake manifold geometry according to FIG. 2. This so-called intake manifold resonance charging may be employed in multicylinder engines with an even number of cylinders (four, six, eight, or twelve cylinders). In the example illustrated, as a result of the simple change-over of a resonator valve, the gas dynamics of a single container system (oscillation curve D3) are energized in two container systems (oscillation curve D4) with half the number of cylinders, and is thereby divided with half the frequency and an increased amplitude. If the "divided" container volume is matched to the natural frequency of the "halved" intake energization, an oscillation response of the measured signal is obtained as shown in idealized form in FIG. 4.

If the formation of the amplitude average value is now considered for full-engine intake energization (opened resonator valve) over one or more intake-synchronized time period segments Ti, the average amplitude value remains essentially constant at zero. In contrast, for "half" intake energization (closed resonator valve) such a result is obtained only when an average is made over two successive intake-synchronized time period segments Ti (halving of the intake energization, i.e., energization with only every other intake stroke). If the average result is determined in this case for only a single intake-synchronized time period segment Ti, the value changes with each time period segment, with the magnitude depending on the resonance amplitude. A potential phase displacement (not illustrated in the figure) remains constant, since the sensor is stationary. When averaging is performed over intake-synchronized time period segment Ti or multiples thereof, the phase displacement in the energization region near the resonance is insignificant anyway.

In the error case, the resonance valve does not switch, or does not switch completely. The effect may thus be easily detected in the resonance rotational speed range by use of an averaging consideration. Here as well, this diagnostic case may be detected in the control device software by means of suitable mathematical and logical algorithms.

Figure 5:
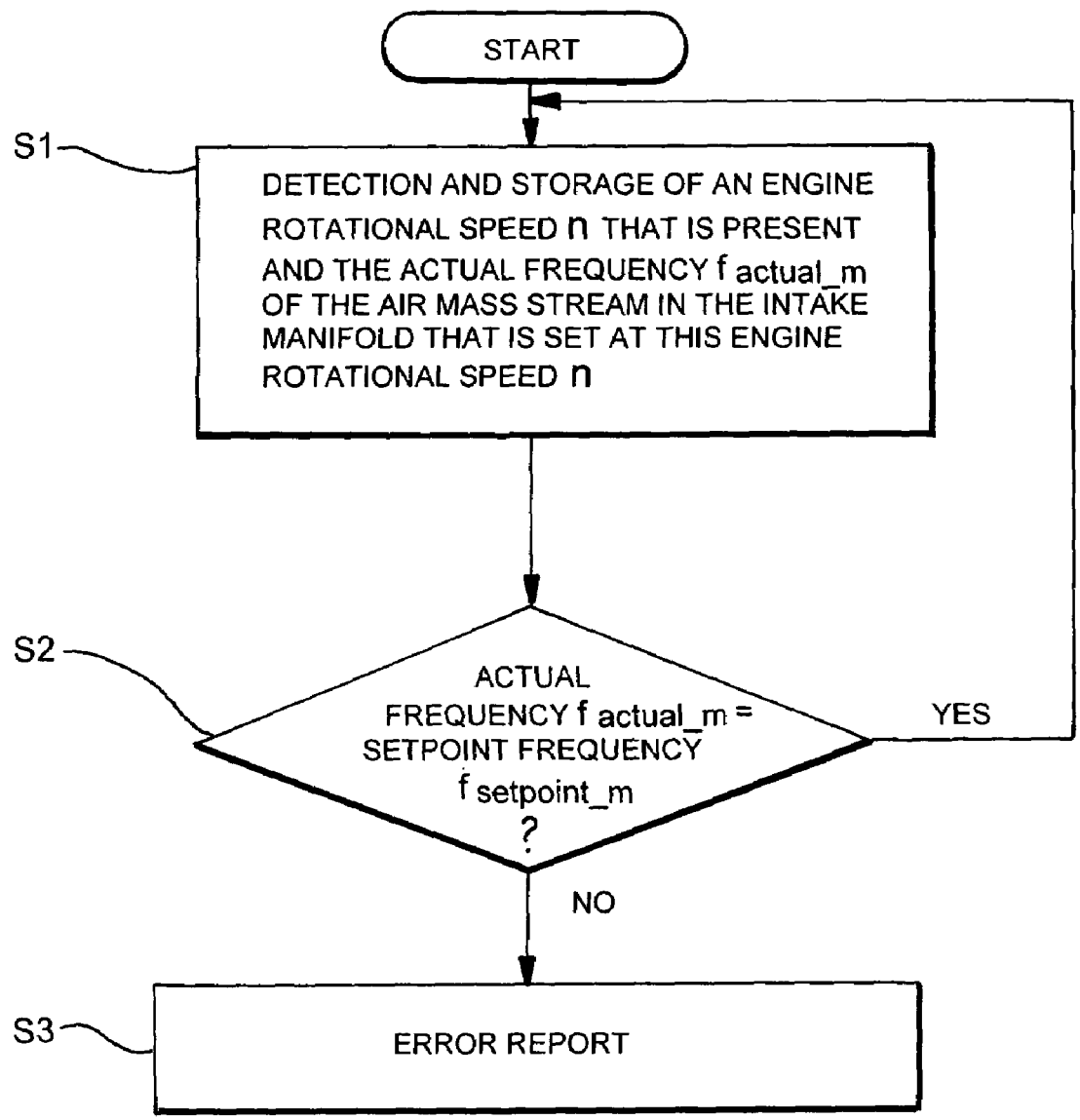
FIG. 5 illustrates a flow diagram of an exemplary method according to the present invention for diagnosing errors in a variable intake system of an internal combustion engine.

FIG. 5 illustrates a flow diagram of an exemplary method according to the present invention for diagnosing errors in an intake system of an internal combustion engine having a variable intake manifold geometry. In a first step S1, an engine rotational speed n that is present and the air mass flow oscillation that is present at this engine rotational speed n are detected in the intake manifold, and the detected engine rotational speed n as well as at least one characteristic variable for the air mass flow oscillation are stored. In the present exemplary embodiment, the actual frequency $f_{actual\_m}$ of the air mass flow oscillation has been detected as the characteristic variable and stored. In a second step S2, the detected actual frequency $f_{actual\_m}$ is compared to a reference variable in the form of a setpoint frequency $f_{setpoint\_m}$, and based on this comparison an error report is generated in a subsequent step S3 when the comparative variables differ from one another by an appropriate amount.

For the comparison which is made between the detected characteristic variable and the setpoint variable, fixed comparative variables (frequencies and/or amplitudes and/or phase angles) for a plurality of rotational speeds n or rotational speed ranges may already be stored in a control unit. The fixed comparative variables generally have been determined by numerous intensive test series during preliminary development. Instead of fixed stored comparative variables, these may also be constantly recomputed during operation of the internal combustion engine by use of a model, based on the available variables.

In another embodiment, likewise alternatively or additionally to the frequency, the amplitude or phase of the air mass flow oscillation may be detected and stored and used as a comparative variable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for diagnosing errors in an intake system of an internal combustion engine having a variable intake manifold geometry, comprising the acts of:
   detecting and analyzing an air mass flow oscillation in an intake manifold at an engine rotational speed;
   storing at least one characteristic actual oscillation variable and the engine rotational speed; and comparing the at least one characteristic actual oscillation variable to a setpoint oscillation variable associated with the engine rotational speed.

2. The method according to claim 1, wherein the setpoint oscillation variable is recomputed for a plurality of engine rotational speeds using a stored model.

3. The method according to claim 2, wherein a frequency of the air mass flow oscillation is used as the at least one characteristic actual oscillation variable.

4. The method according to claim 2, wherein an amplitude of the air mass flow oscillation is used as the at least one characteristic actual oscillation variable.

5. The method according to claim 2, wherein a phase of the air mass flow oscillation is used as the at least one characteristic actual oscillation variable.

6. The method according to claim 2, wherein a frequency and an amplitude of the air mass flow oscillation are used as the at least one characteristic actual oscillation variable.

7. The method according to claim 2, wherein a frequency and a phase of the air mass flow oscillation are used as the at least one characteristic actual oscillation variable.

8. The method according to claim 2, wherein a frequency, an amplitude and a phase of the air mass flow oscillation are used as the at least one characteristic actual oscillation variable.

9. The method according to claim 1, wherein the setpoint oscillation variable is determined for a plurality of engine rotational speeds using test instruments, and has been previously stored.

10. The method according to claim 9, wherein a frequency of the air mass flow oscillation is used as the at least one characteristic actual oscillation variable.

11. The method according to claim 9, wherein an amplitude of the air mass flow oscillation is used as the at least one characteristic actual oscillation variable.

12. The method according to claim 9, wherein a phase of the air mass flow oscillation is used as the at least one characteristic actual oscillation variable.

13. The method according to claim 9, wherein a frequency and an amplitude of the air mass flow oscillation are used as the at least one characteristic actual oscillation variable.

14. The method according to claim 9, wherein a frequency and a phase of the air mass flow oscillation are used as the at least one characteristic actual oscillation variable.

15. The method according to claim 1, wherein a frequency of the air mass flow oscillation is used as the at least one characteristic actual oscillation variable.

16. The method according to claim 1, wherein an amplitude of the air mass flow oscillation is used as the at least one characteristic actual oscillation variable.

17. The method according to claim 1, wherein a phase of the air mass flow oscillation is used as the at least one characteristic actual oscillation variable.

18. The method according to claim 1, wherein a frequency and an amplitude of the air mass flow oscillation are used as the at least one characteristic actual oscillation variable.

19. The method according to claim 1, wherein a frequency and a phase of the air mass flow oscillation are used as the at least one characteristic actual oscillation variable.

20. The method according to claim 1, wherein a frequency, an amplitude and a phase of the air mass flow oscillation are used as the at least one characteristic actual oscillation variable.

* * * * *